United States Patent [19]

Terada et al.

[11] Patent Number: 5,398,389
[45] Date of Patent: Mar. 21, 1995

[54] SWIVEL HOOK

[75] Inventors: Yasuharu Terada, Uozu; Tsuneo Suzuki, Kurobe; Hideyuki Matsushima; Yoshiyuki Horita, both of Toyama, all of Japan

[73] Assignee: Yoshida Kogyo K.K., Tokyo, Japan

[21] Appl. No.: 226,690

[22] Filed: Apr. 12, 1994

[30] Foreign Application Priority Data

Apr. 13, 1993 [JP] Japan .................. 5-110077

[51] Int. Cl.⁶ .............. A44B 13/00; F16B 45/00
[52] U.S. Cl. ................ 24/599.8; 24/599.6; 24/905
[58] Field of Search ........... 24/599.8, 599.6, 599.7, 24/599.9, 600.1, 600.2, 600.3, 598.5, 598.9, 573.5, 905

[56]  References Cited

U.S. PATENT DOCUMENTS

| 553,795 | 1/1896 | Tower | 24/598.9 |
|---|---|---|---|
| 3,831,229 | 8/1974 | Craven | 24/599.8 |
| 5,253,396 | 10/1993 | Rekuc et al. | 24/905 |

FOREIGN PATENT DOCUMENTS

| 0170811 | 2/1986 | European Pat. Off. . |
|---|---|---|
| 2232228 | 12/1974 | France . |
| 3416814A1 | 11/1985 | Germany . |
| 46-28823 | 10/1971 | Japan . |
| 2-80212 | 6/1990 | Japan . |
| 4-93508 | 8/1992 | Japan . |
| 2169647 | 7/1986 | United Kingdom . |
| 2254368 | 7/1992 | United Kingdom . |

*Primary Examiner*—Victor N. Sakran
*Attorney, Agent, or Firm*—Hill, Steadman & Simpson

[57]  ABSTRACT

A swivel hook comprises a hook body including a housing body having a housing chamber which has a opening facing toward a side thereof and a pair of overhangs formed in opposed inner surfaces of the housing chamber, a hook proper provided on the housing body, a latch member mounted on the housing body and being movable into or out of engagement with the hook proper and biasing means mounted on the housing body for normally biasing the latch member causing it to come into engagement with the hook proper; an annular link having a connecting axle provided on one side thereof, the connecting axle having an enlarged head formed on its distal end, the connecting axle rotatably mounted in the housing chamber through the opening with the enlarged head engaging the overhangs; and a plug member closing the opening, thus confining the enlarged head in the housing chamber so that the connecting ring is pivotally and retentively mounted on the hook body.

2 Claims, 10 Drawing Sheets

SWIVEL HOOK

BACKGROUND OF THE INVENTION

1. Field of the Invention

The present invention relates to a swivel hook used for rucksacks, knapsacks, baggages, belts etc., and particularly to a swivel hook comprised of a hook body, a connecting ring pivotally mounted on one end of the hook body and a latch member mounted on the hook body and normally biased by a spring to engage the tip of the hook body for retaining another separate ring or something.

2. Description of the Prior Art

One typical swivel hook of the conventional type is disclosed as in Japanese Utility Model Publication No. 46-28823. The conventional swivel hook is comprised of a hook body and a connecting ring pivotally mounted on the hook body. The hook body and the connecting ring are made separately and later put together. The hook body is made of a metal plate and has a hook formed on the lower end and a small hook arrangement formed on the upper end. The upper hook arrangement is bifurcated to provide an elongated notch. A resilient plate is clamped to the end of the upper hook and is normally biased by its own resiliency to tend to close the hook. The connecting ring has a connecting axle provided centrally on one side thereof. The connecting axle has an enlarged spherical end formed on its lower end. The connecting axle is loosely fitted in the notch so that the connecting ring is able to rotate, mounted on the bifurcated upper hook arrangement of the hook body.

Another conventional type of swivel hook is disclosed as in Japanese Utility Model Laid-open Publication Nos. 2-80212 and 4-93508. Likewise, this conventional swivel hook comprises a hook body and a connecting ring pivotally mounted on the hook body. Instead of having a connecting axle, the connecting ring has a through hole centrally positioned on one side thereof. The hook body has a connecting axle integrally formed on the upper end thereof, and the connecting axle which, in turn, has an enlarged head on its upper end. The through hole is slightly greater in diameter than the enlarged head of the connecting axle, so that the latter can be fitted through the former. After the enlarged head of the connecting axle is fitted through the through hole of the connecting ring, that part of the connecting ring which surrounds the through hole is squeezed, thereby retaining the enlarged head of the connecting axle in the through hole, so that the hook body can be pivotally mounted on the connecting ring around the connecting axle.

These conventional swivel hooks have drawbacks.

In the case of the first conventional swivel hook, to provide the hook body, it is necessary to fold a marginal part of the resilient latch member onto the end of the bifurcated upper hook arrangement, which requires more steps for making the swivel hook. Furthermore, the engaging force between the enlarged head of the connecting axle and the bifurcated upper hook arrangement of the hook body is weak since the hook body is made of a thin metal plate. Furthermore, since the connecting axle is fitted in the elongated notch, the connecting ring is inclined to rattle along the elongated notch. Still furthermore, the enlarged head is partly exposed through the notch, thus making the appearance of the swivel hook, as a whole less attractive.

In the case of the second conventional swivel hook, the connecting ring must be squeezed around the through hole in order to connect the hook body to the connecting ring. This increases production steps of the swivel hook. Since the squeezing operation is effected after the hook body and the connecting ring are painted or plated, the operation is prone to destroy the painted or plated surface of the connecting ring. Furthermore, in the case of the swivel hook disclosed in Japanese Utility Model Laid-open Publication No.. 2-80212, the enlarged head of the connecting axle projects into a belt-inserting hole defined by the connecting ring. This enlarged head is inclined to interfere with the belt-inserting operation. In the case of the swivel hook disclosed in Japanese Utility Model Laid-open Publication No. 4-93508, that one side of the connecting ring into which the enlarged head is inserted must be formed thicker, which makes the swivel hook as a whole less attractive in appearance.

SUMMARY OF THE INVENTION

Taking into account the foregoing difficulties, it is therefore the object of the present invention to provide a swivel hook wherein a connecting ring is firmly and retentively connected to a hook body, and which is easier to manufacture and is attractive in appearance.

According to the present invention, there is provided a swivel hook comprising; a hook body including a housing body having a housing chamber which has a opening facing toward a side thereof and a pair of overhangs formed on opposing inner surfaces of the housing chamber, a hook proper provided on the housing body, a latch member mounted on the housing body and being movable into or out of engagement with the hook proper and biasing means mounted on the housing body for normally biasing the latch member in the direction of coming into engagement with the hook proper; an annular link having a connecting axle provided on one side thereof, the connecting axle having an enlarged head formed on its distal end, the connecting axle rotatably mounted in the housing chamber through the opening with the enlarged head engaging the overhangs; and a plug member closing the opening, thus confining the enlarged head in the housing chamber so that the connecting ring is pivotally and retentively mounted on the hook body.

Many other advantages and features of the present invention will become apparent to those versed in the art upon making reference to the detailed description and the accompanying sheets of drawings in which preferred structural embodiments incorporating the principles of the present invention are shown by way of illustrative example.

DETAILED DESCRIPTION

Some preferred embodiments of the present invention will be described closely in conjunction with the drawings appended hereto.

Figure 1:
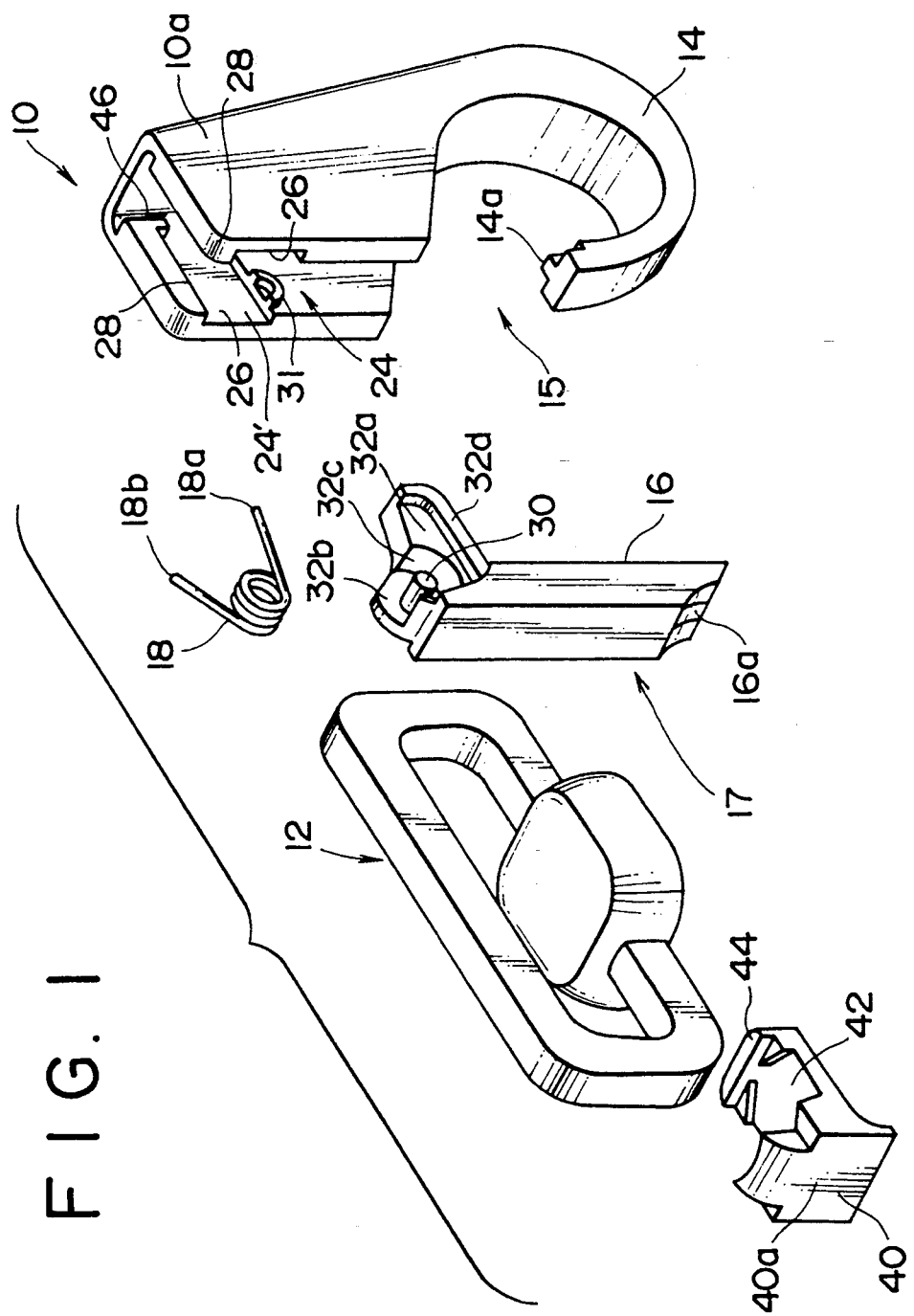
FIG. 1 is an exploded perspective view of a swivel hook according to the first embodiment of the present invention.
Figure 4:
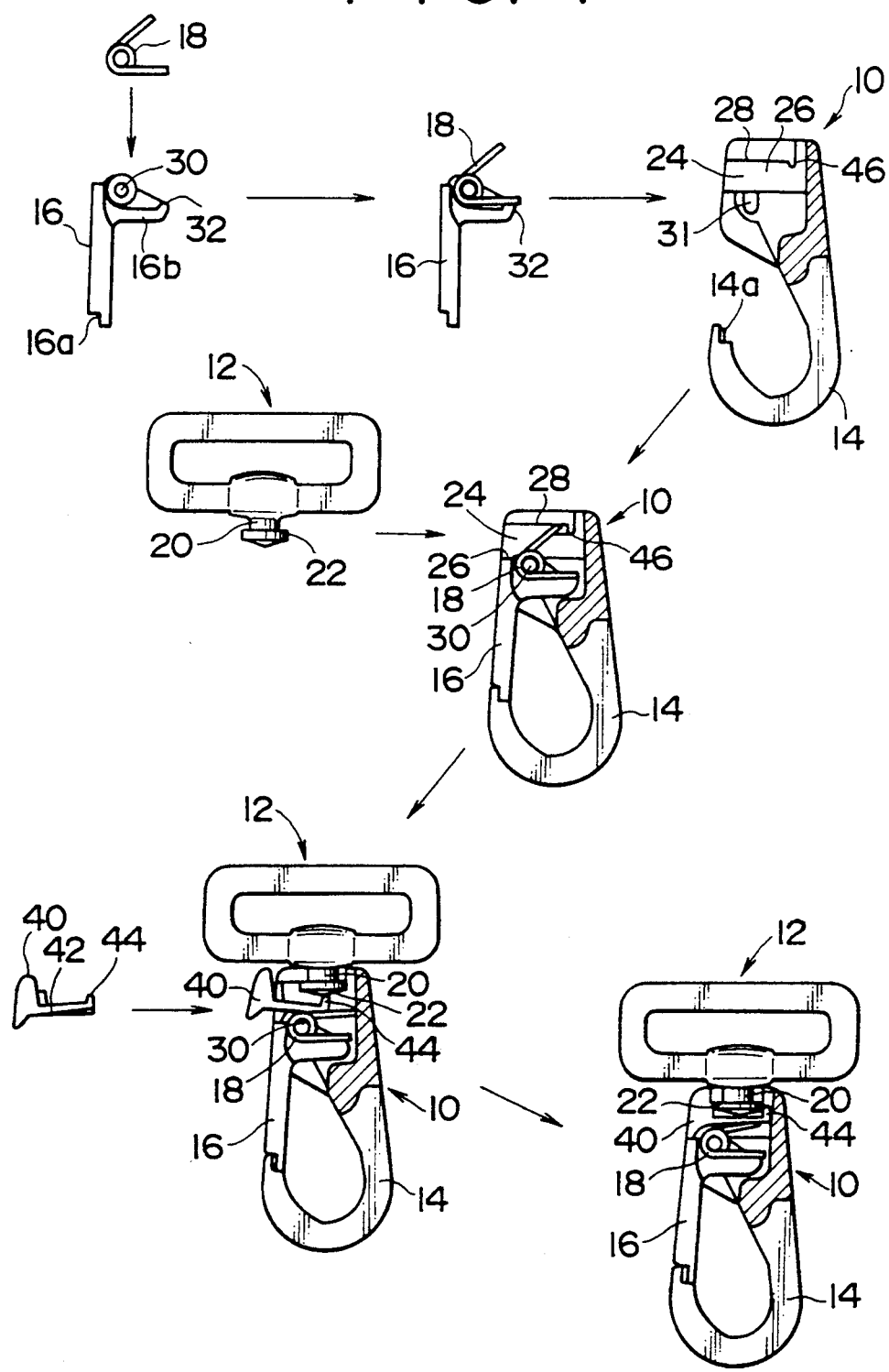
FIG. 4 shows a series of sequential steps for assembling the swivel hook of FIG. 1.

FIGS. 1 and 4 show a swivel hook according to the first embodiment of the present invention. As shown in the drawings, the swivel hook is broadly comprised of a substantially oval hook body 10 and an annular connecting ring 12, both made of metal, the connecting ring 12 being pivotally mounted on the hook body 10. The hook body 10 is comprised of a housing body 10a, a substantially J-shaped hook proper 14 integrally formed with and expending downward from the lower end of the housing body 10a to define a gap 15 with the housing body 10a, a latch member 16 rotatably mounted on the housing body 10a so as to open and close the gap 15, and a biasing means such as a spiral spring 18 mounted on the housing body 10a for normally biasing the latch member 16 in the direction to close the gap 15. The J-shaped hook proper 14 has a fitting projection 14a provided on the distal end of the inner side.

The annular connecting ring 12 has a connecting axle 20 provided centrally on one side thereof so as to project outwardly. The connecting axle 20 has an enlarged head 22 formed on its distal end. The head 22 is greater in diameter than the connecting axle 20.

The housing body 10a has a housing chamber 24 formed therein so as to extend throughout the length of the housing body 10a. The housing chamber 24 has an opening 24' facing toward the front of the housing body 10a. The housing body 10 has a pair of grooves 26, 26 formed on opposing inner surfaces of the housing chamber 24 and disposed in confronting relation to each other. Formation of the confronting grooves 26, 26 provides a pair of confronting overhangs 28, 28 on the opposed inner surfaces. A pair of bearing concaves 31, 31 are formed on the lower marginal edge of the grooves 26, 26 and disposed in confronting relation to each other. A pair of locking portions or locking prongs 46, 46 hang from the inner ends of the overhangs 28, 28 and disposed in confronting relation to each other.

The latch member 17 is of substantially inverted L-shape and comprises a longitudinal latch bar 16 and a lateral bar 32a extending substantially normal to the latch bar 16. The latch bar 16 has a fitting groove 16a on the distal end on the outside, with which the fitting projection 14a of the hook proper 14 is adapted for fitting engagement. The lateral bar 32a is recessed in two depths to provide a side wall 32b, a concave seat 32c contiguous to the side wall 32b and a marginal shelf 32d contiguous to the concave seat 32c. The side wall 32a has a shaft 30 mounted on opposite sides and disposed perpendicularly thereto. The spiral spring 18 is set in the concave seat 32c around the shaft 30 with one end 18b of the spring 18 resting against the marginal shelf 32d. When the latch member 17 is placed onto the hook body 10a, the shaft 30 is adapted so that it is able to rotate on the opposed bearing concaves 31, 31.

The hook body 10 also includes a plug member 40 adapted to be plugged into the opening 24' of the housing chamber 24 after the lateral bar 16b of the latch member 16 and the enlarged head 22 of the connecting ring 12 are engaged in the housing chamber 24, so that the connecting ring 12 is rotatably retained on the hook body 10. The plug member 40 is made of metal and is comprised of a cover wall 40a having such a profile to be complementary with the contour of the opening 24', a horizontal body 42 formed integrally with and extending normal to the cover wall 40a and a locking portion or locking wall 44 mounted vertically on the end thereof and directed upward for locking engagement with the confronting locking prongs 46, 46. When the plug member 40 is plugged into the grooves 26, 26, the horizontal body 42 of the plug member 40 is adapted to pivotally support the enlarged head 22 of the connecting axle 20. Furthermore, the end 18b of the spiral spring 18 abuts the bottom of the horizontal body 42 of the plug member 40, thus biasing the horizontal body 42 against the enlarged head 22 of the connecting ring 12 by resiliency of the spiral spring 18.

For assembling this swivel hook, as shown in FIG. 4, first off, the spring 18 is fitted over the shaft 30 of the latch member 16 with one end 18a of the spring 18 resting on the marginal shelf 32d of the latch member 16. The lateral bar 32a of the latch member 16 with the spring 18 thus resting thereon is inserted into the housing chamber 24 through the opening 24'. The latch member 16 is set in the housing chamber 24 with the shaft 30 able to rotate on the bearing concaves 31, 31. Then, the enlarged head 22 is inserted into the confronting grooves 26, 26 through the opening 24' with the enlarged head 22 engaged with the overhangs 28, 28. The spiral spring 18 biases the latch member 17 to normally rotate the latch member 17 clockwise, as viewed in FIG. 4, to thus bring the distal end of the latch bar 16 into abutting engagement with the distal end of the hook proper 14 with fitting groove 16a of the former fitted with the fitting projection 14a of the latter. Subsequently, the plug member 40 is inserted into the confronting grooves 26, 26 with its forward side slanting downward. The plug member 40 advances with the other end 18b of the spring 18 biasing upward the horizontal body 42 of the plug member 40, which, in turn, biases upward the enlarged head 22 of the connecting ring 12 which is positioned over the horizontal body 42 of the plug member 40. As soon as the terminal locking wall 44 of the plug member 40 passes beyond the locking prongs 46, 46, the terminal locking wall of the plug member 40 is brought into locking engagement with the locking prongs 46, 46 under the resiliency of the spiral spring 18. With the plug member 40 thus plugged and locked in the grooves 26, 26, the enlarged head 22 is entrapped into the grooves 26, 26 so that the connecting ring 12 is rotatably mounted on the hook body 10. The swivel hook has been now assembled.

Even when severe stresses or vibrations are exerted on the connecting ring 12 which, in the case of conventional swivel hooks, would tend to move the enlarged head 22 out of the grooves 26 through the opening 26', in this case, the connecting ring 12 will never released from the hook body 10 since the spiral spring 18 ensuredly biases the terminal locking wall 44 of the plug member 40 into locking engagement with the locking prongs 46, 46 of the hook body 10.

Figure 2:
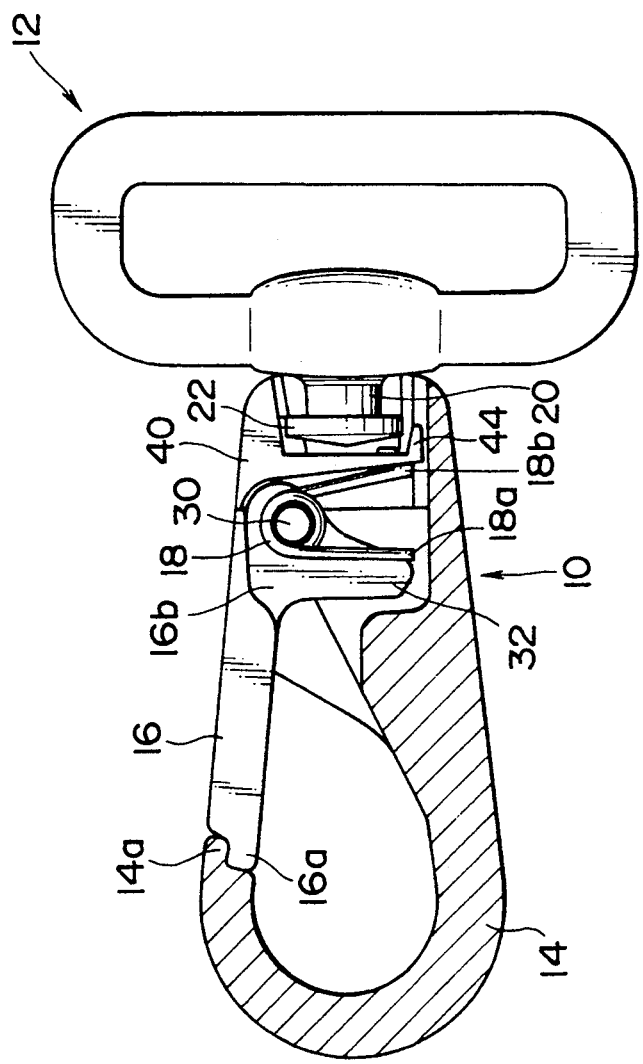
FIG. 2 is a front elevational view, partly in longitudinal cross-section, of the swivel hook of FIG. 1.
Figure 3:
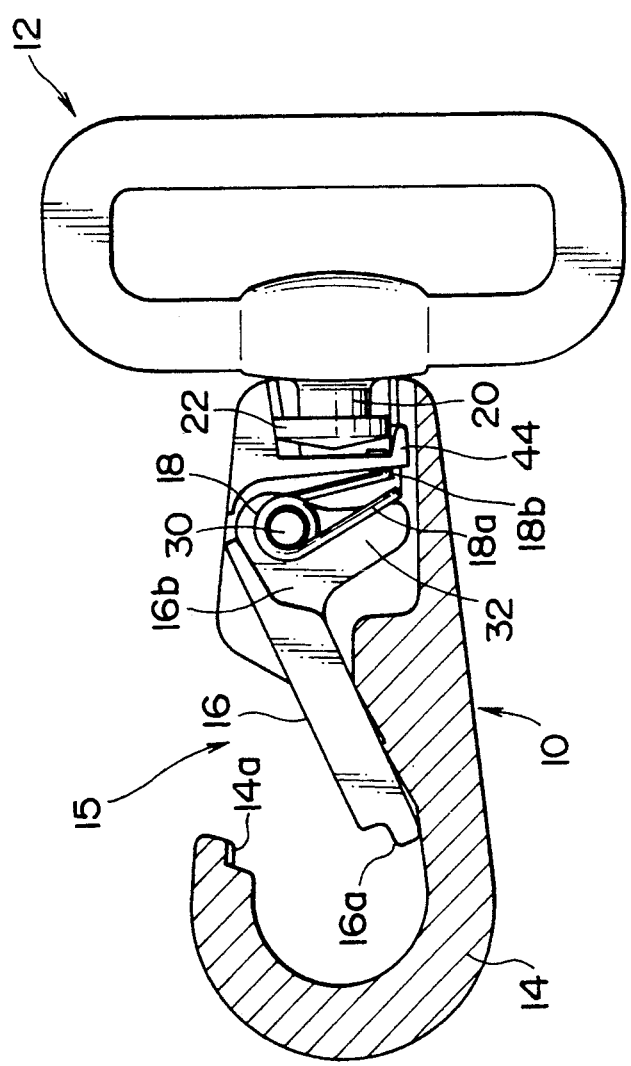
FIG. 3 is a view similar to FIG. 2, but showing a latch member assuming an unlocking position.

Turning now to the operation of the thus assembled swivel hook, as shown in FIG. 2, normally the latch bar 16 of the inverted L-shaped latch member 17 is biased by the spiral spring 18 into engagement with the distal end of the J-shaped hook proper 14 with the fitting groove 16a fitting with the fitting projection 14a. Therefore, for connecting a separate ring (not shown) to the hook proper 14, the latch bar 16 is pressed inward to rotate on counterclockwise, as viewed in FIG. 3, the shaft 30 against the bias of the spiral spring 18 to thus open the gap 15. Then, the separate ring is inserted into the hook proper 14 through the gap 15. Releasing the latch bar 16 causes the latch bar 16 to be restored to its original position by the resiliency of the spiral spring 18, that is, the latch bar 16 comes into abutting engagement with the distal end of the hook proper 14 with the fitting groove 16a fitting with the projection 14a. Since the shaft 30 is resiliently retained in the bearing concaves 31, 31 under the bias of the spiral spring 18, the lateral bar 32a of the latch member 17 is well prevented from coming off the grooves 26, 26.

With the construction set forth above, assembling the connecting ring 12 and the hook body 10 can be done merely by putting the latch member 17 and the plug member 40 in situ in the hook body 10, which dispenses with the squeezing and other attendant operations. This helps to decrease the number of steps for producing the swivel hook. Furthermore, the connecting force between the hook body 10 and the connecting ring 12 has become much greater. Still furthermore, the bearing concaves 37 formed in the housing chamber 24 and the shafts 30 of the L-shaped latch member 17 are completely concealed from the external view, which makes the appearance of the swivel hook as a whole more attractive. Yet furthermore, since the hook body 10, the connecting ring 12, the latch member 17 and plug member 40 are all made of metal, the swivel hook has become better in mechanical strength and aesthetic value. Still furthermore, since the plug member 40 is biased against the enlarged head 22 of the connecting ring 12 by the spiral spring 18, the plug member 40 is securely retained in the housing chamber 24 of the hook body 10 thus preventing accidental rattling.

Figure 5:
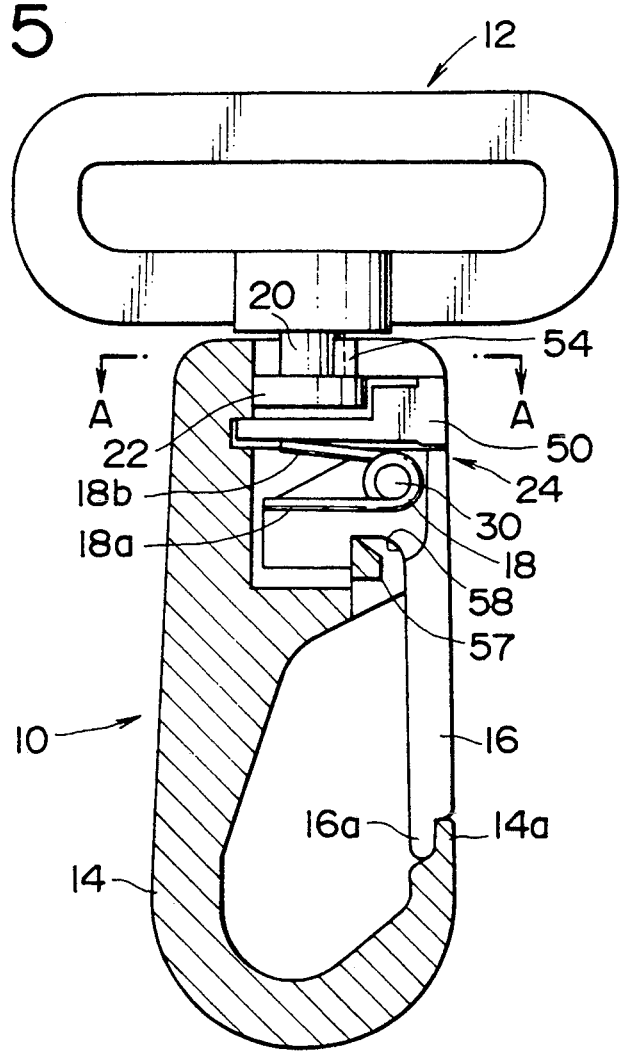
FIG. 5 is a front elevational view, partly in longitudinal cross-section, of a swivel hook according to the second embodiment of the present invention.
Figure 6:
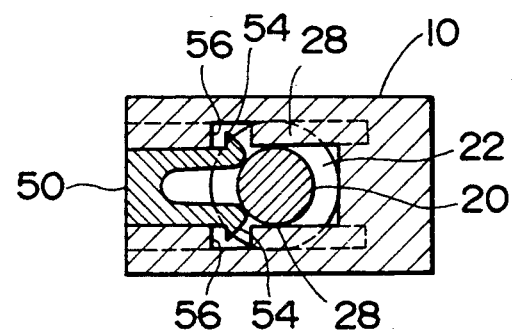
FIG. 6 is a lateral cross-sectional view taken on line A—A of FIG.
Figure 7:
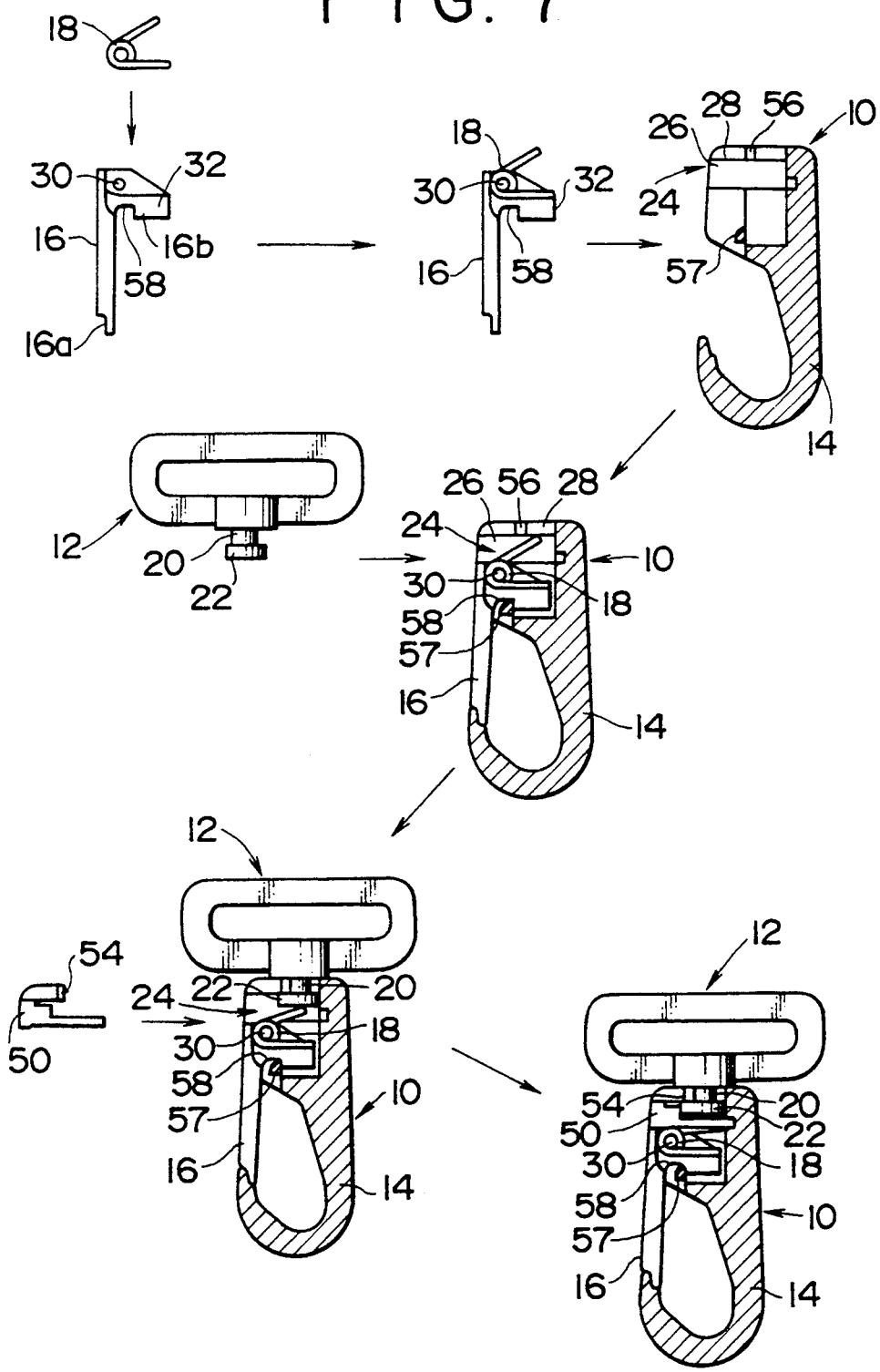
FIG. 7 shows a series of sequential steps for assembling the swivel hook of FIG. 5.
Figure 8:
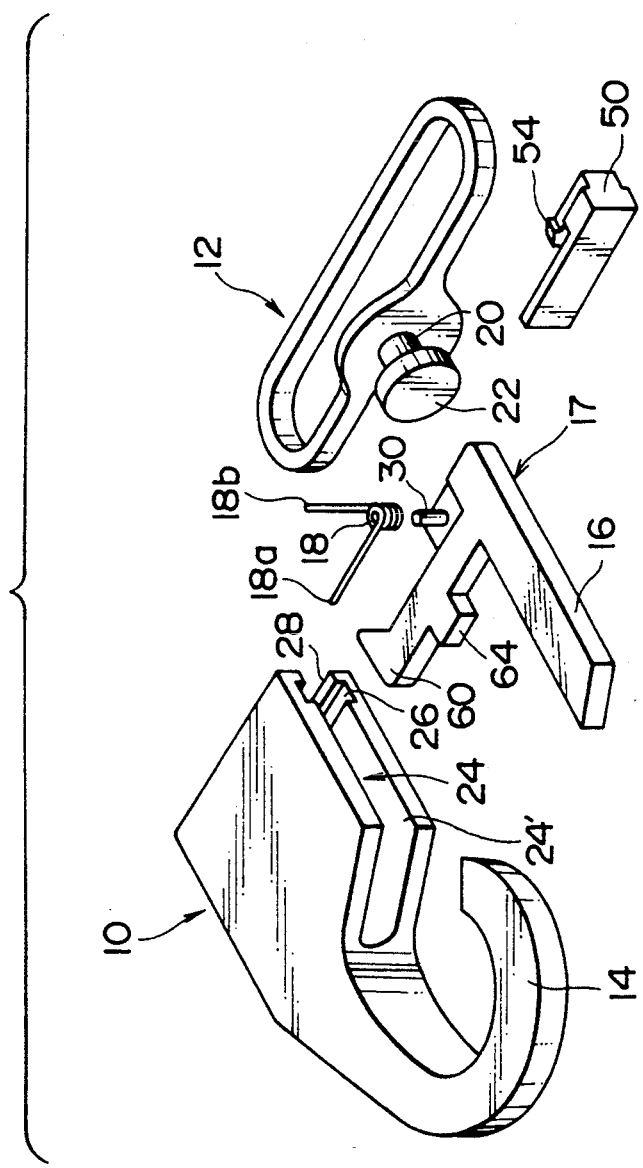
FIG. 8 is an exploded perspective view of a swivel hook according to the third embodiment of the present invention.
Figure 9:
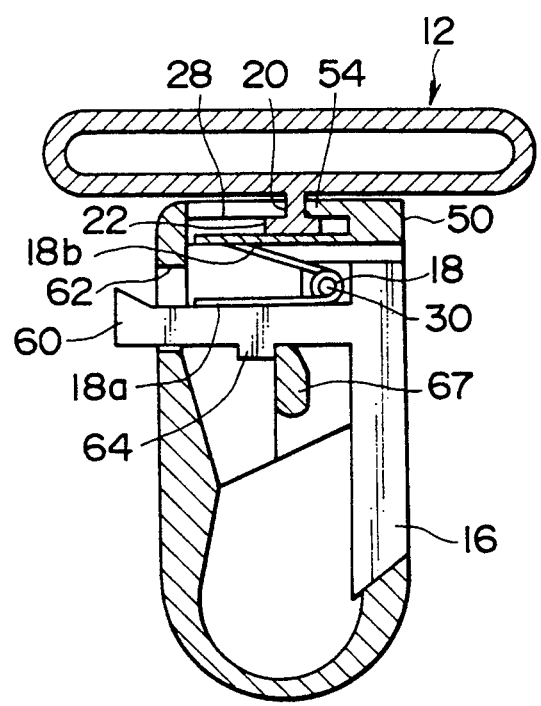
FIG. 9 is a longitudinal cross-sectional view of the swivel hook of FIG. 8.

Turning now to a swivel hook according to the second embodiment of the present invention in conjunction with the drawings FIGS. 5 through 7 wherein the same numbers are assigned to the same parts as those in the preceding embodiment.

According to the second embodiment, the plug member 50 is made of plastics and has a pair of resilient arms 54, 54 formed on the front end, which arms 54, 54, in turn, each have a locking portion or locking finger 54' formed on the distal end, as shown in FIG. 6. The overhangs 28, 28 have a pair of locking parts or locking indentations 56, 56 formed in the middles thereof, respectively, and positioned in confronting relation to each other. The plug member 50 is inserted into the grooves 26, 26 with the opposed arms 54, 54 compressed by the opposed overhangs 28, 28 against the resiliency of the arms 54, 54. As soon as the locking fingers 54', 54' of the arms 54, 54 reach the respective indentations 56, 56, the arms 54, 54 restore their original posture against their own resilience, thus bringing the locking fingers 54', 54' into locking engagement with the respective indentations 56, 56. The plug member 50 is thus locked to the hook body 10 to thus prevent the connecting axle 20 of the ring 12 from coming out of the chamber 24 of the hook body 10.

Instead of the bearing concaves 31, 31 in the preceding embodiment, a bridge portion 57 is mounted in the housing chamber 24 between the inner walls of the housing body 10' and disposed adjacent to the J-shaped hook portion 14. The inverted L-shaped latch member 17 has a notch 58 formed in the inner corner of the latch bar 16 and the lateral bar 32. The L-shaped latch member 17 has its notch 58 bear on the bridge portion 57 of the housing body 10a so that the latch member 17 can turn on the bridge portion 57 for bringing the latch bar 16 into and out of engagement with the J-shaped hook portion 14.

For assembling the swivel hook according to the second embodiment, as shown in FIG. 7, first, the spring 18 is fitted over the shaft 30 of the latch member 16 with one end 18a of the spring 18 resting on the marginal shelf 32d. The lateral bar 32a of the latch member 17, with the spring 18 thus resting thereon, is inserted into the housing chamber 24 through the opening 24'. The latch member 17 is set in the housing chamber 24 with the notch 58 rotating on the bearing bridge 57. Then, the enlarged head 22 is inserted into the confronting grooves 26, 26 through the opening 24' with the enlarged head 22 engaged with the overhangs 28, 28. The spiral spring 18 normally biases the latch member 17 so as to rotate the latch member 17 clockwise, as viewed in FIG. 4, to thus bring the distal end of the latch bar 16 into abutting engagement with the distal end of the hook proper 14, with the fitting groove 16a of the former fitted into the fitting projection 14a of the latter. Subsequently, the plug member 50 is inserted into the confronting grooves 26, 26 with the opposed arms 54, 54 compressed by the opposed overhangs 28, 28 against the resiliency of the arms 54, 54. As soon as the locking fingers 54', 54' of the arms 54, 54 reach the respective indentations 56, 56, the arms 54, 54 restore their original posture against their own resilience, thus bringing the locking fingers 54', 54' into locking engagement with the respective indentations 56, 56. As shown in FIG. 6, the arms 54, 54 of the thus locked plug member 50 are brought into abutting engagement with the periphery of the connecting axle 20 to thus prevent the connecting axle 20 of the connecting ring 12 from coming out of the housing chamber 24 of the hook body 10.

Turning now to the operation of the thus assembled swivel hook. To connect a separate ring (not shown) to the hook proper 14, the latch bar 16 is pressed inward to rotate clockwise, as viewed in FIG. 5, on the bridge 57 against the bias of the spiral spring 18 to thus open the gap 15. Then, the separate ring is inserted into the hook proper 14 through the gap 15. Releasing the latch bar 16 causes the latch member 17 to be restore to its original position by the resiliency of the spiral spring 18, that is, the latch bar 16 comes into abutting engagement with the distal end of the hook proper 14 with the fitting groove 16a fitting with the fitting projection 14a. Since the shaft 30 is retained in the bearing concaves 31, 31 under the bias of the spiral spring 18, the lateral bar 32a of the latch member 17 is well prevented from coming off the grooves 26, 26.

The description goes on to a swivel hook according to the third embodiment of the present invention. The same parts as described in the preceding embodiments will be marked with the same reference numbers for convenience's sake. Detailed description of the same parts will be omitted. According to the third embodiment, a longer lateral bar 60 is integrally provided perpendicularly on the latch bar 16. The lateral bar 60 has an engaging lug 64 provided on the lower side and in the middle thereof. The housing body 10a has a slot 62 formed on the opposite side to the opening 24' of the housing chamber 24. The latch member 17 is set on the housing body 10a with the forward part of the lateral bar 60 project through the slot 62 and the engaging lug 64 abutting on the bridge 67. Furthermore, the horizontal part of the plug member 50 has a slit (not shown) formed therethrough. The other end 18b of the spring 18 passes through the slit of the plug member 50 and comes into direct contact with the enlarged head 22 of the connecting ring 12, which means that the biasing force of the spring 18 acts directly on the enlarged head 22 of the connecting ring 12 to thus retain the enlarged head 22 to the overhangs 28 more securely without rattling.

Figure 10:
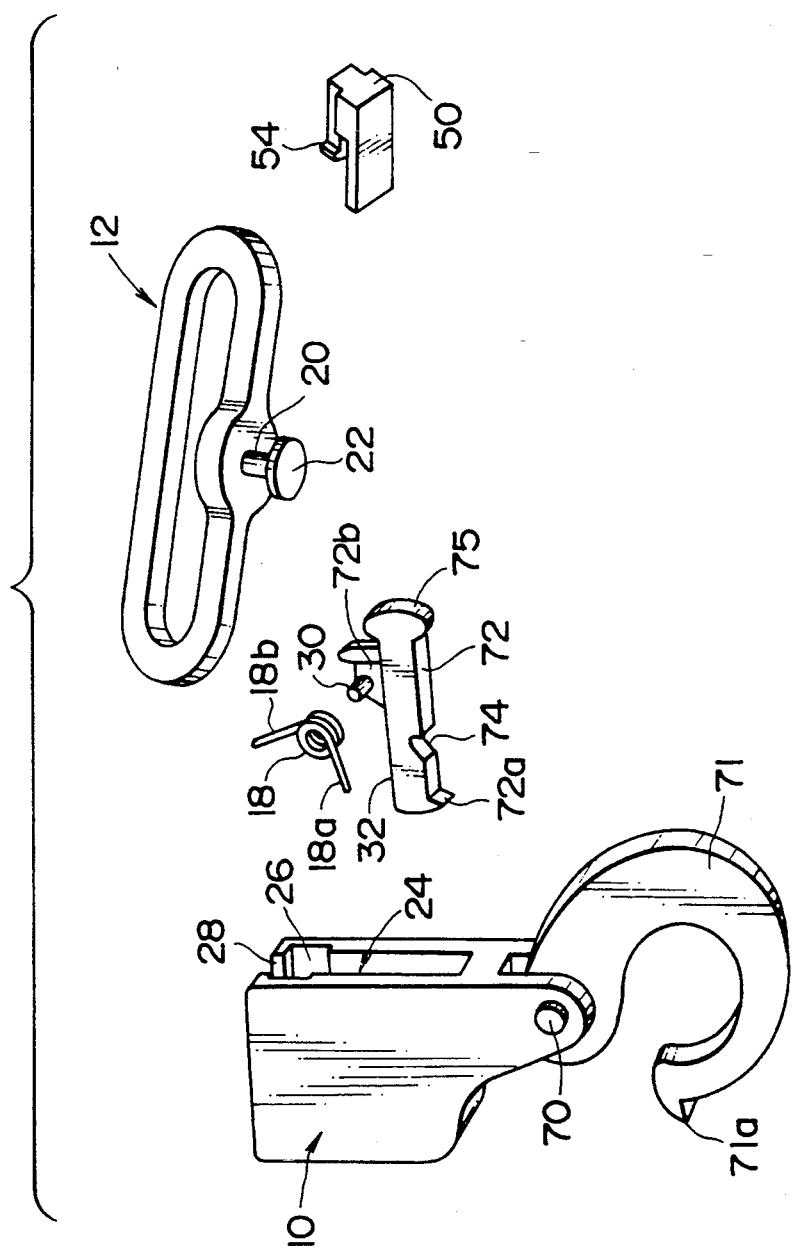
FIG. 10 is an exploded perspective view of a swivel hook according to the fourth embodiment of the present invention.
Figure 11:
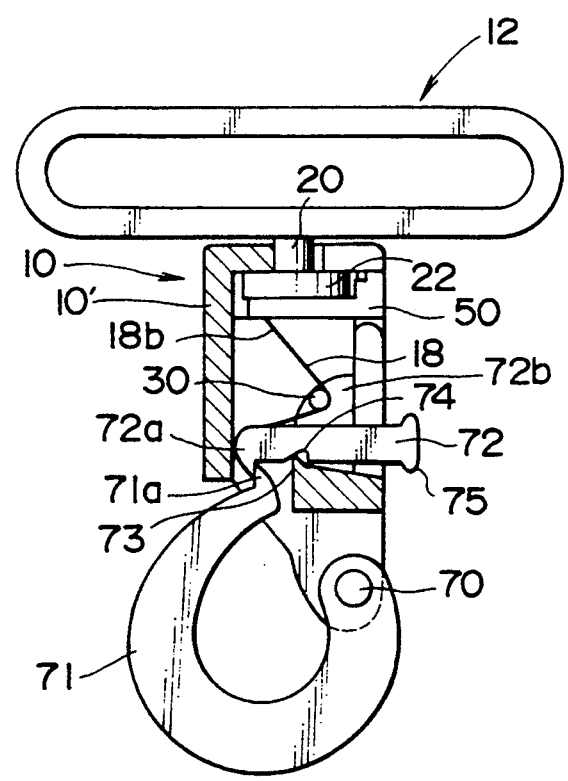
FIG. 11 is a longitudinal cross-sectional view of the swivel hook of FIG. 10.

Description is now made as to a swivel hook according to the fourth embodiment of the present invention in conjunction with FIGS. 10 and 11. Likewise, the same numbers are assigned to the same parts as those in the preceding embodiments. A separate arcuate hook 71 is rotatably mounted on the open side at the lower end of the housing body 10a around a pin 70. The hook 71 has a locking projection 71a on the tip. Instead of the inverted L-shaped latch members according to the preceding embodiments, a substantially rectilinear latch member 72 is employed. The rectilinear latch member 72 includes an engaging protuberance 72a formed on the lower side at one end, a gripping knob 75 formed on the other end and an upper extension 72' formed on the upper side adjacent to the other end. A shaft 30 is mounted on the upper extension 72b for mounting the spiral spring 18 therearound. Furthermore, the rectilinear latch member 72 has an indentation 74 formed in the lower side in the middle. The upper side of the rectilinear latch member 72 constitutes a seat 32 on which one end 18a of the spring 18 rests. The housing body 10a has a ridge 73 mounted on the bottom. As shown in FIG. 11, the rectilinear latch member 72 is mounted on the housing camber 10a with the indentation 74 bearing on the ridge 73. The spiral spring 18 mounted on the shaft 30 has its one end 18a act on the seat 32 of the rectilinear latch member 72 and the other end 18b act on the bottom of the plug member 50.

The construction of the swivel hook according to the invention is not limited to the embodiments described herein before. For example, the housing chamber and the plug member may be of any suitable shape as long as they accomplishes the required function. Furthermore, means of creating the bias need not necessarily be a separate spring, but may be made as a resilient plate formed integrally to the latch member.

With the construction of the swivel hook set forth hereinabove, all that must be done to complete the swivel hook is just to put together the constituent parts, dispensing with any processing steps such as the squeezing operation. This helps to decrease the number of steps in producing the swivel hook. Furthermore, the connecting force between the hook body and the connection ring becomes stronger. Furthermore, the opening to the housing chamber of the hook body is well concealed by various parts, thus rendering the appearance of the swivel hook as a whole attractive. Furthermore, since the plug member is biased by the biasing means against the housing body, the plug member is firmly set to the housing body, so that the connecting ring can be retentively mounted on the hook body for a prolonged period of time.

Obviously, various modifications and variations of the present invention are possible in the light of the above teaching. It is therefore to be understood that within the scope of the appended claims the invention may be practiced otherwise than as specifically described.

What is claimed is:

1. A swivel hook comprising;

a hook body including a housing body having a housing chamber which has a opening facing toward a side thereof and a pair of overhangs formed on opposing inner surfaces of the housing chamber, a hook proper provided on the housing body, a latch member mounted on the housing body and being movable into or out of engagement with the hook proper and biasing means mounted on the housing body for normally biasing the latch member in the direction of coming into engagement with the hook proper;

an annular link having a connecting axle provided on one side thereof, the connecting axle having an enlarged head formed on its distal end, the connecting axle rotatably mounted in the housing chamber through the opening with the enlarged head engaging the overhangs; and a plug member closing the opening, thus confining the enlarged head in the housing chamber so that the connecting ring is pivotally and retentively mounted on the hook body.

2. A swivel hook according to claim 1, the plug member having a locking portion formed thereon, the housing body having a locking part formed in the housing chamber, a part of the plug member underlying the enlarged head of the connecting ring the biasing means acting between the latch member and the plug member so that the biasing means biases the plug member so as to bring the locking portion of the plug member into engagement with the locking part of the housing chamber, and biases the enlarged head against the overhangs.

* * * * *